United States Patent

Barbot

[15] 3,706,191
[45] Dec. 19, 1972

[54] RAKING IMPLEMENTS
[72] Inventor: Claude Barbot, Senonches, France
[73] Assignee: C. van der Lely C., N.V., Maasland, Netherlands
[22] Filed: March 22, 1971
[21] Appl. No.: 126,703

[30] Foreign Application Priority Data

March 20, 1970 Netherlands ....................... 7003965

[52] U.S. Cl. ................................................. 56/377
[51] Int. Cl. ............................................. A01d 77/06
[58] Field of Search ........ 56/365, 366, 367, 375, 376, 56/377

[56] References Cited

UNITED STATES PATENTS

| 3,103,776 | 9/1963 | van der Lely et al. | 56/366 |
| 2,680,343 | 6/1954 | Enos, Jr. | 56/377 |
| 2,807,927 | 10/1957 | ven der Lely et al. | 56/377 |
| 2,876,613 | 3/1959 | van der Lely et al. | 56/377 |
| 2,955,407 | 10/1960 | van der Lely et al. | 56/377 |
| 2,689,446 | 9/1954 | Sorrels | 56/377 |
| 2,960,815 | 11/1960 | van der Lely et al. | 56/377 |
| 3,091,907 | 6/1963 | van der Lely | 56/377 |

FOREIGN PATENTS OR APPLICATIONS

| 1,432,155 | 2/1966 | France | 56/366 |
| 240,634 | 6/1965 | Austria | 56/377 |

Primary Examiner—Russell R. Kinsey
Attorney—Mason, Mason & Albright

[57] ABSTRACT

A raking implement for attachment to a prime mover to displace crop lying on the ground, has an inclined main frame beam and a plurality of rotatable rake wheels mounted on the frame beam. The main frame beam has different coupling points for other frame parts to be releasably connected thereto so that the implement can be converted to different types of rakes.

15 Claims, 6 Drawing Figures

INVENTOR
CLAUDE BARBOT
BY
Mason, Mason & Albright
Attorneys

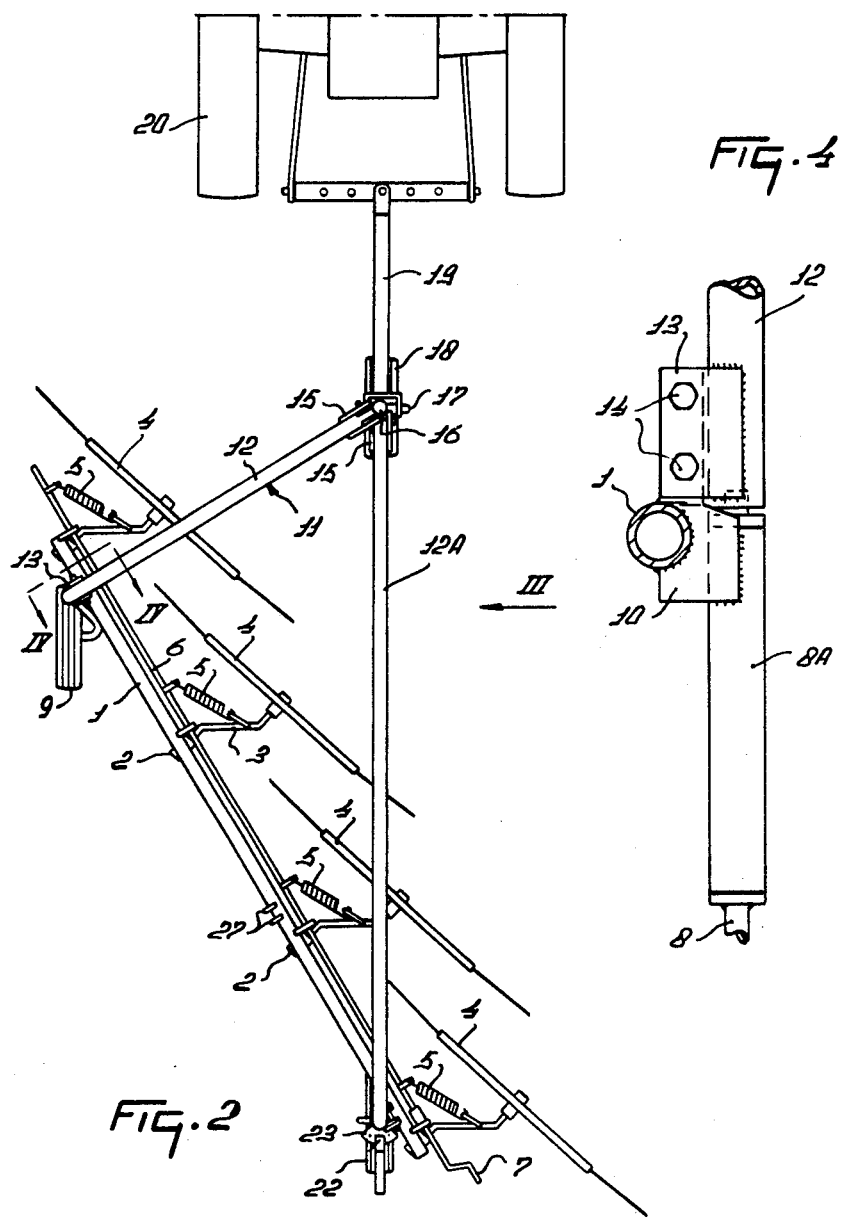

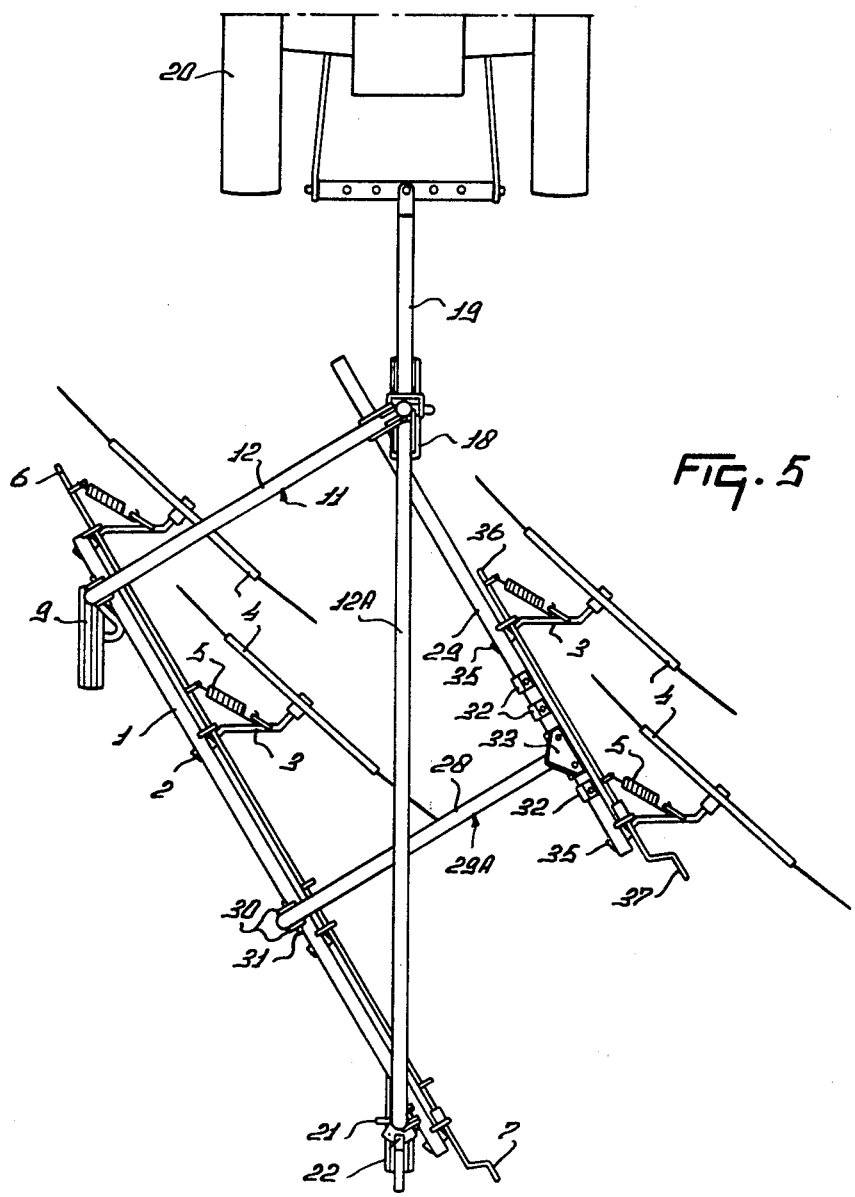

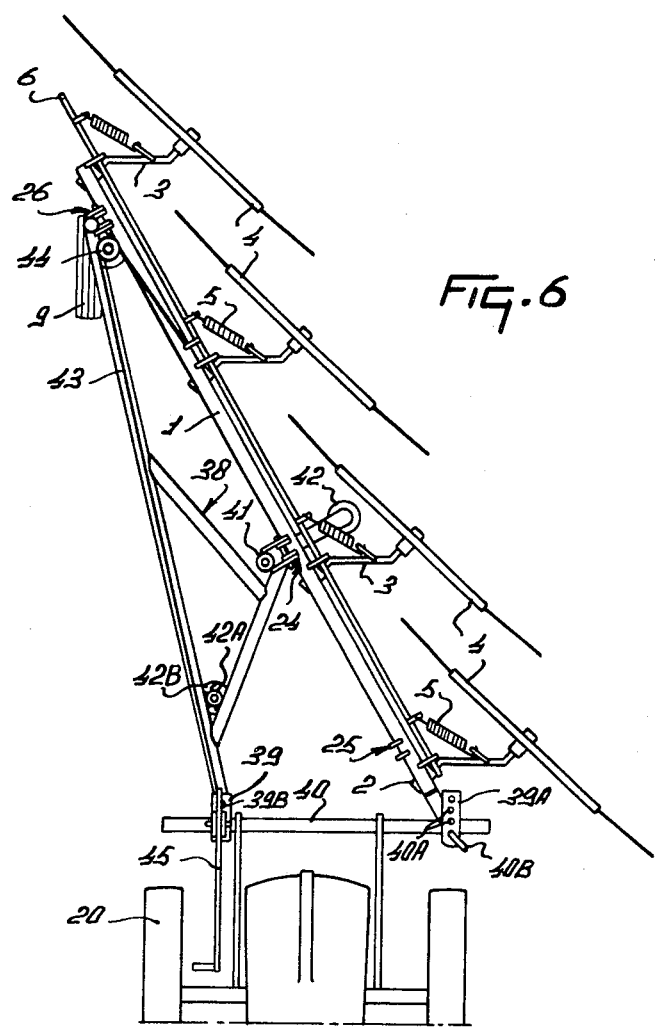

RAKING IMPLEMENTS

Known raking implements of this kind which are capable of performing raking operations of different types are usually both heavy and complicated and can be connected to an operating tractor or other vehicle in only one way. Accordingly, it is an object of the invention to provide a versatile raking implement which is nevertheless of a simple and relatively inexpensive construction.

According to one aspect of the invention, there is provided a raking implement of the kind set forth, wherein said frame beam is provided at at least three different points with coupling means adapted to have other frame parts releasably connected to them.

Figure 1:
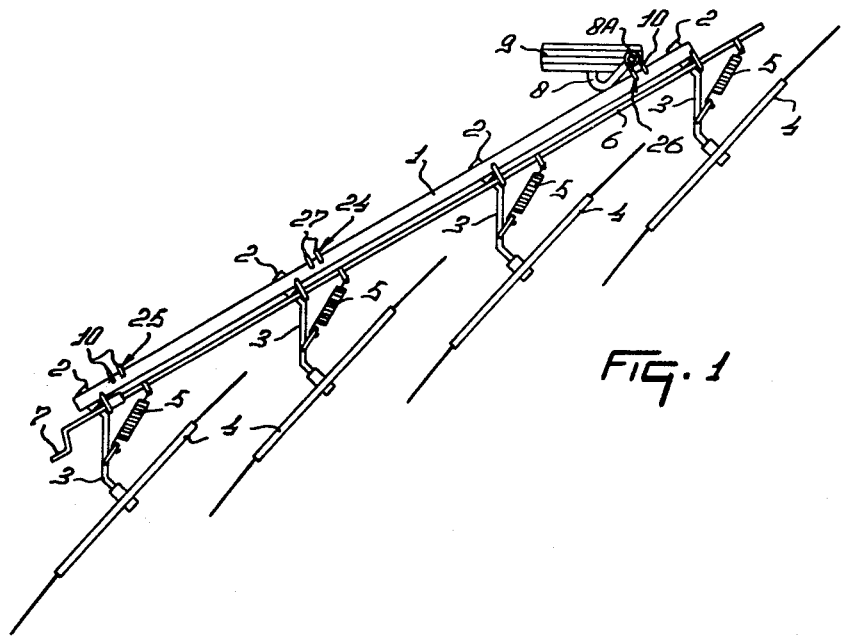
Figure 3:
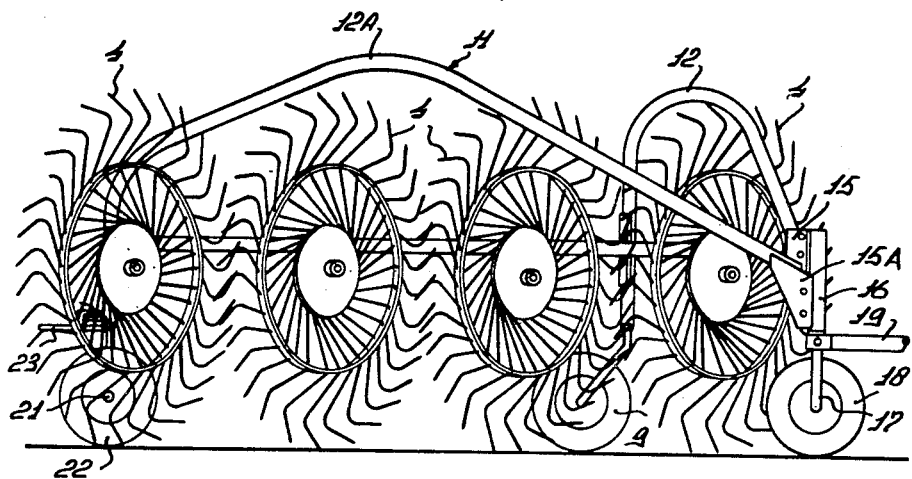

For a better understanding of the invention, and to show how the same may be carried into effect, reference will now be made, by way of example, to the accompanying drawings, in which:

FIG. 1 is a plan view of a main frame beam of a raking implement in accordance with the invention and also shows the arrangement of four rake wheels and a ground wheel, FIG. 2 is a plan view corresponding to FIG. 1 but also showing the arrangement of a frame part that can be used to connect the implement to the rear of an agricultural tractor, FIG. 3 is a side elevation as seen in the direction indicated by an arrow III in FIG. 2 but does not shown the tractor which is illustrated in the former Figure, FIG. 4 is a view, to an enlarged scale, as seen in the direction indicated by arrows IV—IV in FIG. 2, FIG. 5 corresponds to FIG. 2 but shows an alternative working position of the implement in which additional parts are employed to enable it to function as a swath turner, and FIG. 6 is a plan view showing the main frame beam of FIG. 1 together with a frame part by which said beam can be operatively arranged at the front of an agricultural tractor.

Referring to FIG. 1 of the drawings, the part of the raking implement which is illustrated comprises a main frame beam 1 that extends substantially horizontally and which is provided, at regular intervals along its length, with substantially horizontally disposed sleeve bearings 2. The ends of corresponding cranks 3 are turnably mounted in the sleeve bearings 2 and the opposite end of each crank 3 has one of four rake wheels 4 rotatably mounted thereon. Helical tension springs 5 extend between eyes fastened to the cranks 3 and further eyes that are mounted at regular intervals along a rod 6 that extends parallel to the main frame beam 1 closely adjacent to that beam. The rod 6 is connected to the main frame beam 1 by way of a number of guides which enable said rod to be longitudinally displaced relative to the beam 1 by a manually-operated crank and spindle mechanism 7 which may be of known construction. It will be evident from the drawings that the pressures by which the rake wheels 4 bear against the ground surface can be altered by longitudinal displacement of the rod 6 relative to the beam 1 to increase or decrease the degree of tension in the springs 5. A position of the rod 6 is possible in which the rake wheels 4 are lifted entirely clear of contact with the ground surface and this position can conveniently be adopted when the raking implement is to be transported from one place to another without performing any raking operation.

A castor ground wheel 9 is provided adjacent the front of the frame beam 1 with respect to the intended direction of operative travel of the implement over the ground (i.e. from left to right as seen in FIG. 1 of the drawings), said ground wheel 9 being rotatable about a horizontal axle portion of a profiled supporting rod 8, which rod has an upper vertical portion that is turnably received in a substantially vertical bearing 8A that is fastened to the main frame beam 1. A pair of vertically disposed but horizontally spaced apart lugs 10 projects laterally from the main frame beam 1 close to the bearing 8A towards the leading end of said beam 1. A second similar pair of lugs 10 projects laterally from the main frame beam 1 near the trailing end of that beam. Two arched coupling beams 12 and 12A (FIGS. 2 and 3) forming members of a coupling frame part 11 are arranged to extend over the row of rake wheels 4 with their respective rear ends connected to an appropriate one of the two pairs of lugs 10. For this purpose, the rear ends of said beams 12 and 12A are provided with brackets 13 (FIGS. 2 and 4) having holes which will register with holes in portions of the lugs 10 to enable a rigid connection to be established by bolts 14. The shapes of the lugs 10 can be seen best in FIG. 4 of the drawings.

The formost ends of the two arched coupling beams 12 and 12A are provided with differently shaped brackets 15 and 15A (FIG. 3) and these brackets are bolted to apertured strips or the like projecting from a vertical bearing 16. The upper end of a profiled rod 17 is rotatably disposed in the bearing 16 and the lower end of said rod is shaped to form a horizontal axle for a ground wheel 18 which wheel, it will be noted, is not a castor wheel. The rear end of a draw bar 19 is connected to the rod 17, immediately beneath the bearing 16, by a transverse pin in such a way that said draw bar is turnable about the axis of the bearing 16 in common with the ground wheel 18. The leading end of the draw bar 19 is illustrated in FIG. 2 of the drawings as being connected by a vertical hitch pin or the like to the tow bar at the rear of an agricultural tractor 20.

It can be seen from FIG. 2 of the drawings that the arched coupling beam 12A is contained in a substantially vertical plane which extends substantially parallel to the intended direction of travel during operation of the raking implement. The leading ends of the two coupling beams 12 and 12A are interconnected at substantially the same horizontal level as that occupied by the main frame beam 1. A third ground wheel 22 is arranged at the rearmost end of the arched coupling beam 12A and a profiled rod 21, generally similar to the previously described rod 17, affords both its axle and a substantially vertical axis, in conjunction with a substantially vertical bearing, about which the plane of rotation of the wheel 22 is angularly adjustable. However, in this case, an adjusting mechanism 23 is provided to enable the plane of rotation of the ground wheel 22 to be maintained in any chosen one of a number of different angular settings relative to the remainder of the implement. The adjusting mechanism 23 may have the simple known construction which can be seen in outline in FIGS. 2 and 3 of the drawings. The adjusting mechanism 23 can be used to vary the working width of the implement as dictated by the requirements of the hay or other crop being dealt with and to bring the implement to a minimum overall width of transport purposes.

When the implement is disposed as illustrated in FIGS. 2 and 3 of the drawings, it will function as a side delivery rake since the crop displaced by the foremost rake wheel 4 with respect to the intended direction of operative travel is moved into the path of the succeeding rake wheel 4 and so on until all of the displaced crop is deposited as a single swath or windrow located immediately to the right of the rearmost one of the four rake wheels 4. The main frame beam 1 is provided with a further pair of vertically disposed but horizontally spaced apart lugs 27 which occupy a position a short distance to the rear of that beam from its midpoint. The lugs 27 afford a coupling point 24 and the previously mentioned lugs 10 afford coupling points 25 and 26 (FIG. 6) which are located near the rear and front ends of the beam 1 respectively. The coupling points 24, 25 and 26 are arranged in a row. As can be seen in FIG. 5 of the drawings, the lugs 27 affording the coupling point 24 has the rearmost end of an arm 28 which is arched over the rake wheels 4 connected to them with the aid of brackets 30 and bolts 31 that are substantially equivalent to the previously described brackets 13 and bolts 14 (FIG. 4). The end of the arched arm 28 that is remote from the brackets 30 is connected to a rake wheel support 29 that extends parallel to the main frame beam 1 at substantially the same horizontal level as that beam. The interconnected arm 28 and support 29 form an auxiliary frame part 29A.

It can be seen from FIG. 5 of the drawings that the upper surface of the rake wheel support 29 is provided with five equally spaced apart anchorages 32 to any chosen neighboring pair of which a plate 33 at the leading end of the arm 28 can be secured by bolts. The arm 28 and rake wheel support 29 can thus be bolted to one another in any one of four different relative positions. A clamp which is not visible in the drawings is employed to pivotally secure the leading end of support 29 to the leading end of coupling beam 12. It will be appreciated that the support 29 can thus occupy any one of four different positions relative to the main frame beam 1. The support 29 is provided with two sleeve bearings 35 in which the cranks 3 of two rake wheels 4, that have been removed from their sleeve bearing on the main frame beam 1, can be received. The two transferred rake wheels 4 may be those that are normally located third and fourth along the main frame beam 1 from its leading end. A rod 36 is connected to the rake wheel support 29 by guides so as to extend closely parallel to that support and so as to be longitudinally displaceable relative thereto by means of a further crank and spindle mechanism 37. The rod 36 is provided at appropriate points along its length with eyes to which the ends of the helical tension springs 5 corresponding to the two transferred rake wheels 4 can be connected. It will be evident that the crank and spindle mechanism 37 can be used in the same way as the previously described mechanism 7 to adjust the pressures by which the two transferred rake wheels 4 bear against the ground surface. When the implement is disposed as illustrated in FIG. 5 of the drawings, it will function as a swath turner. Adjustment of the implement to suit different swath spacings is effected by moving the rake wheel support 29 relative to the main frame beam 1 in the manner which has previously been described.

The part of the implement which is shown in FIG. 1 of the drawings can also be mounted at the front of the agricultural tractor 20 or other operating vehicle in the manner which is illustrated in FIG. 6 of the drawings. For this purpose, an alternative coupling frame part 38 is provided, said frame part 38 being provided with members for connection to the front coupling point 26 and approximately central coupling point 24 in the same way as has already been described with particular reference to FIG. 4 of the drawings. The rearmost end of the alternative coupling frame part 38 may be connected by a bracket 39 to a substantially horizontal beam 40 mounted transversely at the front of the agricultural tractor 20. Similarly, the rearmost end of the main frame beam 1 can be coupled by a bracket 39A to the same beam 40. However, the bracket 39A is formed with a row of holes 40A into any one of which a vertical locking pin 40B can be entered to establish a connection between the bracket and the rear end of the main frame beam 1, there being a single hole formed in a lug or the like at said end of the beam 1. A substantially vertical pivot pin 39B establishes a pivotal connection between the frame part 38 and the bracket 39 so that the particular hole 40A in the bracket 39A that is chosen will determine the angular setting of the row of rake wheels 4 about the pivot pin 39B with respect to the agricultural tractor 20. A vertical sleeve or bush 41 is carried by the alternative coupling frame part 38 adjacent the coupling point 24 and receives an inclined upwardly and downwardly adjustable supporting foot 42. A second supporting foot 42B of non-inclined construction is upwardly and downwardly adjustable with respect to a sleeve or bush 42A carried by the frame part 38 at a point a short distance forwardly thereof from the bracket 39. The two supporting feet can be moved downwardly to hold the implement in an upright position on the ground surface, in conjunction with the ground wheel 9, when the implement is disconnected from the agricultural tractor 20 or other vehicle.

When the alternative coupling frame part 38 is employed, the crank and spindle mechanism 7 is removed from the implement and replaced by a cable 43 one end of which is fastened to an eye on the rod 6 that is disposed towards the front end of that rod. The cable 43 passes around a horizontal pulley 44 rotatably carried by the frame part 38 and from thence to a control lever 45 that is turnably supported on top of the bracket 39. The lever 45 can be operated from the tractor 20 to alter the initial degree of tension of the springs 5. It will be realized that the implement will function as a side delivery rake when arranged as illustrated in FIG. 6 of the drawings and that it can be equally well function as a swath turner merely by employing the auxiliary frame part 29A that has previously been described. Two of the rake wheels 4 are transferred to the support 29 of said auxiliary frame part 29A and the rearmost end of its arched beam 28 is secured to the lugs 10 affording the rear coupling point 25.

The part of the implement which is shown in FIG. 1 of the drawings forms a unit which can be employed with the coupling frame part 11 or the alternative coupling frame part 38 to form a side delivery rake which can be located either at the front or the rear of an agricultural tractor or other vehicle equipped with suitable coupling parts. Alternatively, the implement may function as a swath turner that, once again, can be located either at the front or at the rear of an agricultural tractor or other vehicle. The implement is of simple and therefore relatively inexpensive construction but can be arranged to effect a variety of different raking operations merely by employing the basic unit of the implement in conjunction with the appropriate frame part or parts.

While various specific features of the implement have been described, illustrated in the drawings and set forth in the following claims as inventive features, it is to be noted that the broad aspects of the invention is not necessarily limited to these features.

What we claim is:

1. A raking implement for connection to a prime mover, comprising a frame having a main frame beam and a plurality of rake wheels rotatably mounted on said main beam, coupling means on said main beam to which additional frame parts are selectively connected to said main beam whereby the working positions of said wheels can be changed, said coupling means comprising at least three spaced apart coupling points on said main frame beam, two of said coupling points being located adjacent the leading and rearmost ends of said main frame beam and said beam extending obliquely transverse with respect to the direction of operative travel, a third coupling point being located between said leading and rearmost coupling points, attaching means on said frame for connecting the implement to the prime mover and said attaching means being interconnected with at least one of said two coupling points adjacent the leading and rearmost ends of the main beam.

2. An implement as claimed in claim 1, wherein said additional frame parts comprise arched beam means that are connected to said attaching means.

3. An implement as claimed in claim 2, wherein said arched beam means is connected to the front and rear coupling points, said beam means including two coupling beams having their foremost ends connected to one another, the trailing ends of said coupling beams being connected to the leading and rearmost points of said main frame beam.

4. An implement as claimed in claim 3, wherein one of said coupling beams has a trailing end connected to said rearmost coupling point and being contained in a substantially vertical plane that extends substantially parallel to the direction of operative travel of said implement.

5. An implement as claimed in claim 4, wherein a ground wheel is connected to said frame adjacent the foremost ends of said coupling beams, said ground wheel being rotatably mounted in said frame and being angularly adjustable about a substantially vertical axis.

6. An implement as claimed in claim 3, wherein a ground wheel is connected to said main frame beam adjacent the leading coupling point with respect to the direction of operative travel.

7. An implement as claimed in claim 6, wherein a further ground wheel is rotatably mounted on said main beam and is angularly adjustable about a substantially vertical axis with respect to said main frame beam.

8. An implement as claimed in claim 3, wherein said two coupling beams are releasably connected to the leading and rearmost coupling points of said main frame beam with fastening means.

9. An implement as claimed in claim 1, and further including a bearing on said main frame beam and a ground wheel is supported by said bearing adjacent one end of said main frame beam.

10. An implement as claimed in claim 9, wherein said additional frame parts include two coupling beams connected to said leading and rearmost coupling points and said bearing is located adjacent the trailing end of one of said coupling beams, the last mentioned coupling beam being contained in a substantially vertical plane extending substantially parallel to the intended direction of operative travel.

11. An implement as claimed in claim 10, wherein said ground wheel is turnable in said bearing and locking means is supported on said frame to secure the ground wheel in any one of a plurality of different angular settings about a substantially vertical axis relative to said implement.

12. An implement as claimed in claim 1, wherein said main frame beam is located to the rear of the rake wheels, said additional frame parts including two coupling beams that are connected to at least two of said coupling points and arched forwardly over said rake wheels from connections to said main frame beam.

13. An implement as claimed in claim 12, wherein said coupling beams are connected to one another at their other ends and their junction is located at substantially the same horizontal level as said main frame beam.

14. A raking implement for connection to a prime mover, comprising a main frame beam and a plurality of rake wheels rotatably mounted on said beam, coupling means on said main frame beam selectively connecting additional frame parts to said beam, said frame parts comprising two arched arms connected to said coupling means and said arms extending over and above said rake wheels and being interconnected to one another at their forward ends, a first arched arm secured to a leading coupling point of said coupling means and the other arched arm secured to a rearmost coupling point of said coupling means, said main frame beam being positioned to extend obliquely relative to the intended direction of operative travel, ground wheels supported on said main beam and located immediately below the connections of the ends of said arched arms with the coupling points on said main frame beam, attaching means associated with the forward portion of said arms for connection thereof to the prime mover.

15. A raking implement as claimed in claim 14, wherein the forward ends of said arched arms are secured in brackets on a vertical bearing of said attaching means and said bearing rotatably mounts a leading ground wheel.

* * * * *